UNITED STATES PATENT OFFICE.

CHARLES L. MOORES, OF BALTIMORE, MARYLAND.

PAINT.

SPECIFICATION forming part of Letters Patent No. 581,487, dated April 27, 1897.

Application filed February 15, 1897. Serial No. 623,562. (No specimens.)

*To all whom it may concern:*

Be it known that I, CHARLES L. MOORES, a citizen of the United States, residing at Baltimore, in the State of Maryland, have invented certain new and useful Improvements in Paint Composition for Ships' Bottoms, of which the following is a specification.

The object of my invention is to provide an improved paint compound especially adapted to the conditions which exist on bottoms of ships and other vessels that navigate salt water, where it is often desirable to put the vessel in water immediately after the fresh paint has been applied and before it has become dry.

In attaining the object in view I have made numerous experiments with a great variety of paint compounds applied both on wood and metal which were subjected for long periods to the action of sea-water, and my present invention is the result of these experiments.

My paint composition consists of the following ingredients, which are combined in the proportions stated, as follows: Pulverized rosin, ground graphite, ground soapstone, and soft tallow, in equal quantities by measure, are mixed together, and a sufficient quantity of linseed-oil is added to put the mass in proper condition to be ground in a paint-mill to effect the thorough incorporation of the ingredients. After the grinding operation has been completed Japan drier is added in sufficient quantity, which will be understood by a practical painter or a person skilled in the art. Thus prepared the compound is ready for storage or shipment.

To use the paint composition, the painter should add enough linseed-oil to thin it to the proper consistence for use with the brush and any coloring to suit the fancy. It is preferably applied when of the consistency termed by painters "second coating."

This paint compound may be applied on any kind of vessel-bottom—wood or metal—and as soon as it is applied the vessel may go out of dock. It makes a tough, moderately-hard, permanent, and smooth surface. It prevents grass, slime, and barnacles from collecting on the bottom and is a complete antifouling paint compound for use in sea-water. It has also been found that its effects on the movement of the vessel are most salutary. The bottom of the vessel is remarkably smooth and frictionless, and thus speed is promoted.

This compound applied to piles which are in the water prevents them from getting wormy or fouling with barnacles. It is also useful for wire rope and metal surfaces that need protection from rust.

Having thus described my invention, what I claim is—

The herein-described paint compound consisting of pulverized rosin, ground graphite, ground soapstone, and soft tallow in equal quantities by measure and a sufficient quantity of linseed-oil the whole thoroughly incorporated, as set forth.

In testimony whereof I affix my signature in the presence of two witnesses.

CHARLES L. MOORES.

Witnesses:
   CHAPIN A. FERGUSON,
   CHARLES B. MANN, Jr.